Aug. 16, 1927.
S. RUBEN
PYROMETER
Filed May 28, 1921
1,639,534
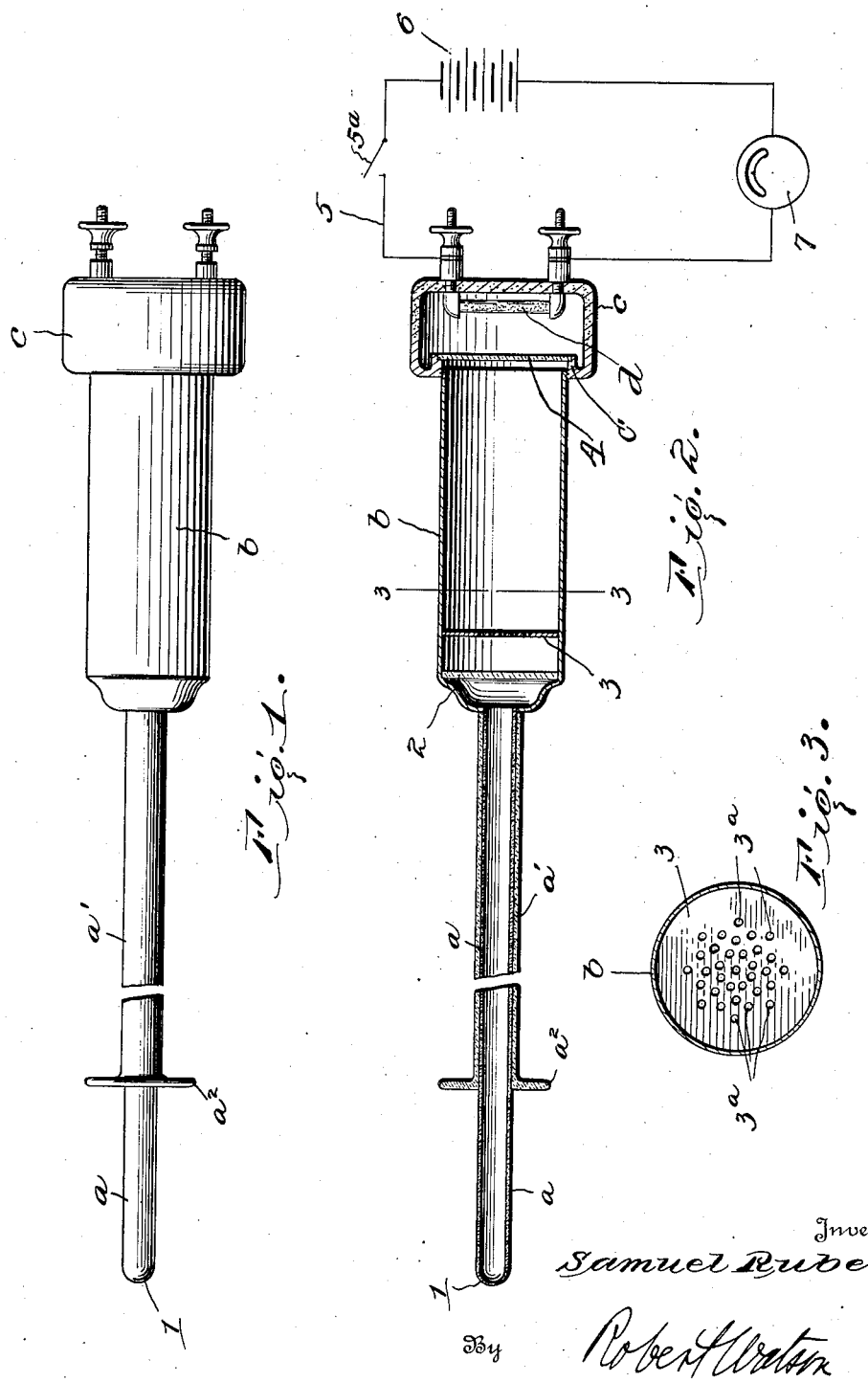
Inventor
Samuel Ruben.
By Robert S. Watson
Attorney Patented Aug. 16, 1927.

1,639,534

UNITED STATES PATENT OFFICE.

SAMUEL RUBEN, OF NEW YORK, N. Y.

PYROMETER.

Application filed May 28, 1921. Serial No. 473,458.

This invention relates to a pyrometer adapted for use in measuring very high temperatures. In carrying out the invention, I provide a tube of refractory material adapted to emit light rays when heated in a retort or furnace chamber, and associated with the tube, in a position to be acted upon by the light rays, is arranged a selenium cell in an electric circuit containing a meter, this cell being enclosed so as to cut off light rays from all other sources. As the light intensity varies with the heat, and the conductivity of the selenium cell varies with the light intensity, the meter readings will indicate the temperature in the retort or furnace chamber in which the tube is inserted. As the resistance of the selenium cell is affected by the spectral color of the light, and also by heat, the invention comprises means for cutting off certain of the light rays and also means for preventing conducted heat from passing from the tube to the selenium cell. While the selenium cell is preferred, any other substance whose conductivity is affected by light may be substituted for the selenium cell.

In the accompanying drawing,

Fig. 1 is a side view of the pyrometer, the electric circuit and indicating instrument being omitted;

Fig. 2 is a longitudinal section through the pyrometer, the electric circuit and meter being shown; and, Fig. 3 is a section on the line 3—3 of Fig. 2.

Referring to the drawing, $a$ indicates a tube of refractory material capable of being heated to various stages of incandescence without injury. One end of the tube is closed, as shown at 1, and the other end is open and fitted gas-tight into one end of a relatively short internally polished metal tube $b$. The tube $a'$ has a stop or gage $a^2$ adapted to engage a fixed object to limit the length of tube inserted into the furnace or chamber whose temperature is to be indicated. This gage, as shown in the drawing, consists of a flange on a shorter tube $a'$, which encloses the tube $a$ and abuts against the end of the metal tube. Within the metal tube and immediately in front of the open end of the refractory tube is arranged a glass disk 2, which fits gas-tight within the metal tube to prevent gases from the furnace, which may pass through the refractory tube from entering and injuring the metal tube. This glass disk is red in color and is opaque to radiant heat, but is transparent to light rays above the invisible or infra red region, and permits only these latter rays to pass into and through the metal tube. Immediately in front of the glass disk 2 is arranged a polished metal disk 3, which is finely perforated, as shown at $3^a$ in Fig. 3, to allow the light rays to pass through, while serving as a means for reflecting and dissipating the heat which is absorbed by the gases in the tube. The end of the tube $b$, opposite the refractory tube, extends into a lightproof casing $c$, in which is arranged a selenium cell $d$. The lightproof casing has an inwardly turned flange $c'$ provided with a clear glass disk 4 in line with the end of the tube $b$. The purpose of this disk is to close the casing and protect the cell against mechanical injury.

The selenium cell is arranged opposite the end of the tube 3, in order that the light rays from the refractory tube may strike upon it, and it is connected in an electric circuit 5, which includes a battery 6, a switch $5^a$ for opening and closing the circuit, and a meter 7, preferably a volt meter.

In operation, the end of the refractory tube which projects beyond the flange $a^2$ is inserted through a suitable opening into the furnace or retort whose temperature is to be indicated, and this end of the tube becomes incandescent by reason of the high temperature, and the intensity of the light rays emitted by the tube varies with the temperature. The light rays from the interior of the refractory tube strike the colored glass disk, which is opaque to radiant heat but transparent to light rays above the invisible or infra red region, and these latter rays pass through the metal tube, thence through the clear glass disk 4 and into the casing $c$, where they fall upon the selenium cell. It is desirable to keep the temperature of the selenium cell as constant as possible, since its conductivity is affected by the temperature, and for this reason the polished metal perforated disk is placed in the metal tube to reflect the heat which is absorbed by the gases in the tube and prevent it from entering the casing in which the cell is located. The polished inner wall of the metal tube also aids in this function. The light rays passing through the perforated disk strike the selenium cell and affect its conductivity in a well known manner, according to the intensity of the light. The metal tube and lightproof casing in which the cell is located constitute a housing which excludes light from all other sources except that transmitted from the refractory tube, so that the cell is not affected by light from other sources. As the selenium cell is acted upon by the light rays emitted from the refractory tube $a$, it will be evident that the readings on the meter will indicate the light intensity emitted by said tube, and since the light intensity is a function of the temperature, the meter will indicate the temperature of the refractory tube and of the furnace or retort.

The properties of the selenium cell are well known and while I prefer to use the selenium cell, any other substance whose conductivity is substantially affected by light rays may be substituted for the selenium cell.

What I claim is:

1. In a pyrometer, a body of refractory material adapted to emit light rays when heated, an electric meter, a circuit including said meter and a substance whose conductivity is affected by light, a light-proof housing closed at one end by said body and enclosing said substance, and a colored glass partition, which is opaque to radiant heat but transparent to certain light rays, in said housing.

2. In a pyrometer, a body of refractory material adapted to emit light rays when heated, an electric meter, a circuit including said meter and a substance whose conductivity is affected by light, a light-proof housing closed at one end by said body and enclosing said substance, and a polished perforated reflecting partition in said housing between said body and said substance.

3. In a pyrometer, a tube of refractory material, open at one end, an electric meter, a circuit including said meter and a selenium cell, a light-proof enclosure for said cell, a metal tube connecting the open end of said refractory tube with said enclosure, and a colored glass partition, which is opaque to radiant heat but transparent to certain light rays, in said metal tube.

4. In a pyrometer, a tube of refractory material, open at one end, an electric meter, a circuit including said meter and a selenium cell, a light-proof enclosure for said cell, a metal tube connecting the open end of said refractory tube with said enclosure, and a polished perforated reflecting partition in said metal tube.

In testimony whereof I affix my signature.

SAMUEL RUBEN.